(12) United States Patent
Lucas et al.

(10) Patent No.: US 10,727,508 B2
(45) Date of Patent: Jul. 28, 2020

(54) FUEL CELL SYSTEM AND METHOD FOR SWITCHING OFF A FUEL CELL STACK

(71) Applicant: Audi AG, Ingolstadt (DE)

(72) Inventors: Christian Lucas, Braunschweig (DE); Natalja Ermatschenko, Wolfsburg (DE); Daniel Grundei, Braunschweig (DE)

(73) Assignee: Audi AG, Ingoltadt (DE)

(*) Notice: Subject to any disclaimer, the term of this patent is extended or adjusted under 35 U.S.C. 154(b) by 416 days.

(21) Appl. No.: 15/520,818

(22) PCT Filed: Sep. 30, 2015

(86) PCT No.: PCT/EP2015/072549
§ 371 (c)(1),
(2) Date: Apr. 20, 2017

(87) PCT Pub. No.: WO2016/062506
PCT Pub. Date: Apr. 28, 2016

(65) Prior Publication Data
US 2017/0317364 A1    Nov. 2, 2017

(30) Foreign Application Priority Data
Oct. 21, 2014 (DE) ................ 10 2014 221 321

(51) Int. Cl.
*H01M 8/04223* (2016.01)
*H01M 8/04228* (2016.01)
(Continued)

(52) U.S. Cl.
CPC .... *H01M 8/04231* (2013.01); *H01M 8/04111* (2013.01); *H01M 8/04179* (2013.01);
(Continued)

(58) Field of Classification Search
CPC ......... H01M 8/04111; H01M 8/04179; H01M 8/04201; H01M 8/04223; H01M 8/04228; H01M 8/04231
See application file for complete search history.

(56) References Cited

U.S. PATENT DOCUMENTS

2003/0148167 A1    8/2003 Sugawara et al.
2005/0118471 A1    6/2005 Fukuma et al.
(Continued)

FOREIGN PATENT DOCUMENTS

CN    101262069 A    9/2008
CN    101533920 A    9/2009
(Continued)

*Primary Examiner* — Lingwen R Zeng
(74) *Attorney, Agent, or Firm* — Seed Intellectual Property Law Group LLP (57) ABSTRACT

The disclosure relates to a fuel cell system comprising a fuel cell stack comprising anode chambers and cathode chambers, an anode supply comprising an anode supply path for supplying an anode operating gas to the anode chambers, and an anode exhaust path for discharging an anode exhaust gas from the anode chambers, and a cathode supply comprising a cathode supply path for supplying a cathode operating gas to the cathode chambers and a cathode exhaust path for discharging a cathode exhaust gas from the cathode chambers, and comprising a negative-pressure generation means for generating a negative pressure in the cathode chambers. It is provided that the negative-pressure generation means is designed as an ejector which is connected to a compressor arranged in the cathode supply path on the pressure input side, and to the cathode chambers of the fuel cell stack on the suction side, in a fluid-conducting manner.

11 Claims, 4 Drawing Sheets

(51) Int. Cl.
    *H01M 8/04111*    (2016.01)
    *H01M 8/04082*    (2016.01)
    *H01M 8/04119*    (2016.01)

(52) U.S. Cl.
    CPC ... *H01M 8/04201* (2013.01); *H01M 8/04223* (2013.01); *H01M 8/04228* (2016.02)

(56) References Cited

U.S. PATENT DOCUMENTS

2007/0235325 A1*   10/2007   Kamachi .......... H01M 8/04007
                                                            204/275.1
2008/0182138 A1     7/2008   Salvador et al.

FOREIGN PATENT DOCUMENTS

| | | |
|---|---|---|
| CN | 103348522 A | 10/2013 |
| DE | 102 51 878 A1 | 7/2003 |
| DE | 10 2011 114 721 A1 | 4/2013 |
| DE | 10 2011 119 665 A1 | 5/2013 |
| DE | 10 2011 087 912 A1 | 6/2013 |
| DE | 10 2012 023 799 A1 | 6/2014 |
| JP | S62-150665 A | 7/1987 |
| JP | 2006-294402 A | 10/2006 |
| JP | 2007-188666 A | 7/2007 |
| WO | 2012/013460 A1 | 2/2012 |

* cited by examiner

FUEL CELL SYSTEM AND METHOD FOR SWITCHING OFF A FUEL CELL STACK

The invention relates to a fuel cell system comprising a fuel cell stack and a method for switching off the fuel cell stack Fuel cells use the chemical conversion of a fuel with oxygen into water in order to generate electrical energy. For this purpose, fuel cells contain what is known as the membrane electrode assembly (MEA) as a core component, which is an arrangement of an ion-conducting (often proton-conducting) membrane and of an electrode (anode and cathode) respectively arranged on both sides of the membrane. In addition, gas diffusion layers (GDL) can be arranged on both sides of the membrane electrode assembly on the sides of the electrodes facing away from the membrane. Generally, the fuel cell is constituted by a plurality of MEAs arranged in the stack, the electrical power outputs of which MEAs accumulate. Between the individual membrane electrode assemblies, bipolar plates (also called flow field plates) are usually arranged which ensure a supply of the individual cells with the operating media, i.e. the reactants, and are usually also used for cooling. In addition, the bipolar plates ensure an electrically conductive contact to the membrane electrode assemblies.

During operation of a polymer electrolyte membrane (PEM) fuel cell, the fuel, especially hydrogen $H_2$ or a gas mixture containing hydrogen, is supplied over an open flow field of the bipolar plate on the anode side to the anode, where electrochemical oxidation of $H_2$ to $H^+$ with loss of electrons takes place. Via the electrolyte or the membrane, which separates the reaction chambers gas-tight from one another and electrically insulates them, the protons $H^+$ are transported from the anode chamber into the cathode chamber (in a water-bound or water-free manner). The electrons provided at the anode are guided to the cathode via an electrical line. The cathode receives oxygen or a gas mixture containing oxygen (such as air) via an open flow field of the bipolar plate on the cathode side, so that a reduction of $O_2$ to $O^{2-}$ with gain of electrons takes place. At the same time, the oxygen anions react in the cathode chamber with the protons transported via the membrane to form water.

In order to supply a fuel cell stack with its operating media, i.e. the reactants, said stack comprises on the one hand an anode supply and on the other hand a cathode supply. The anode supply comprises an anode supply path for supplying an anode operating gas to the anode chambers and an anode exhaust path for discharging an anode exhaust gas from the anode chambers. The cathode supply likewise comprises a cathode supply path for supplying a cathode operating gas to the cathode chambers and a cathode exhaust path for discharging a cathode exhaust gas from the cathode chambers of the fuel cell stack.

To switch off the fuel cell stack, it is known to remove the air present in the cathode chambers. This serves on the one hand to prevent oxide formation of the catalytic material and thus the reduction of its effectiveness. On the other hand, what is known as an air-air start, in which air is present both on the anode side and on the cathode side and which also leads to a degradation of the catalyst, is to be prevented in a later restart of the system. A known strategy for removing air from the cathode chambers provides to flood the cathode chambers with fuel, in particular hydrogen, via a flushing line after switching on the air supply, which on the one hand displaces the air and on the other hand reacts with any residual oxygen still present and thus binds it chemically. For this conversion, the hydrogen and oxygen must be brought together on the catalytic material of the cathode. It is disadvantageous that the reaction of the hydrogen with the oxygen in the cathode chambers partially takes place in a diffusion-controlled manner and thus relatively slowly. The conversion of the oxygen furthermore requires a stoichiometric quantity of hydrogen and thus increases the total consumption of hydrogen.

In order to compensate for the degradation of the catalytic material, which is mostly platinum, it is known to increase the platinum concentration. This is cost-intensive, however.

DE 10 2012 023 799 A1 describes a method for switching off a fuel cell system, in which a negative pressure is applied to the anode and/or cathode side after turning off the electrical power drain from the fuel cell in order to dry the fuel cell, and the anode and/or cathode side is subsequently filled with fuel in order to avoid an ingress of oxygen during the idle state. In order to produce the negative pressure on the cathode side, a vacuum pump of a brake booster is used, which vacuum pump is connected on the suction side to a negative-pressure line which connects the cathode and anode exhaust gas lines to one another.

DE 10 2011 119 665 A1 describes a fuel cell system in which a gas jet pump functioning according to the Venturi principle is arranged in the cathode exhaust gas line, to the pressure input side of which pump is applied the cathode exhaust air and the suction side of which pump is connected to a discharge pressure line connected to the anode exhaust gas line. If the system is to be prepared for a restart of the fuel cell, a negative pressure is generated in the anode chambers by means of the gas jet pump in order to remove water from said anode chambers. The water is guided to the cathode exhaust gas (exhaust air) via the discharge pressure line and the gas jet pump.

In the system disclosed in DE 10 2011 114 721 A1, a gas jet pump is connected on the pressure input side to an air delivery device and on the output side to the cathode chambers. The suction side of the gas jet pump is connected to a sorption device for water, with a partial current of the exhaust air flowing through said sorption device. In this way, a humidification of the cathode supply air takes place.

The invention is now based on the task of providing a fuel cell system that is suited to quickly and efficiently eliminate oxygen from the cathode chambers of the fuel cell stack when the system is switched off. Furthermore, a method for switching off the fuel cell stack is to be proposed.

These tasks are solved by a fuel cell system and a method for switching of the same having the features of the independent claims.

The fuel cell system according to the invention comprises a fuel cell stack comprising cathode chambers and anode chambers. The fuel cell system furthermore comprises an anode supply comprising an anode supply path for supplying an anode operating gas to the anode chambers and an anode exhaust path for discharging an anode exhaust gas from the anode chambers. The fuel cell system furthermore comprises a cathode supply comprising a cathode supply path for supplying a cathode operating gas to the cathode chambers and a cathode exhaust path for discharging a cathode exhaust gas from the cathode chambers. The cathode supply furthermore comprises a negative-pressure generation means for generating a negative pressure in the cathode chambers of the fuel cell stack. It is provided according to the invention that the negative-pressure generation means is designed as an ejector, which is connected in a fluid-conducting manner on the pressure input side to a compressor arranged in the cathode supply path and on the suction side to the cathode chambers of the fuel cell stack.

By using a negative-pressure generation means, a quick evacuation of the cathode chambers of the fuel cell stack and thus a quick removal of the cathode operating gas, in particular air, from the cathode chambers is brought about. Furthermore, the quantity of fuel, such as hydrogen, required for the complete chemical reaction of the residual oxygen present in the cathode chambers is reduced. Ejectors are jet pumps that, in contrast to injectors, primarily have a suction effect and are thus designed to generate a negative pressure. Ejectors are advantageous with respect to other negative-pressure generation means, such as pumps or vacuum blowers, in that they do not require any electrical or mechanical operating power but function passively. For their operation, no additional energy expenditure is thus required. Ejectors also have the advantage that they do not have any movable parts and are thus maintenance-free and wear-free. Ejectors comprise three fluid connectors, namely a pressure input (pressure side), a suction input (negative-pressure connector), and an output. In the fuel cell system according to the invention, the pressure input of the ejector is connected in a fluid-conducting manner to the compressor of the cathode supply path, namely on its high-pressure side. Compressed cathode operating gas, in particular compressed air, which serves as propellant is thus applied to a drive nozzle present in the ejector. A negative pressure is thereby produced downstream of the nozzle at the suction input, which has a fluid connection to the cathode chambers in the present invention. A negative pressure is thus generated in accordance with the Venturi principle at the suction input and thus produced in the cathode chambers of the fuel cell stack. The propellant as well as the aspirated medium leave the ejector together at the output.

On the output side, the ejector is preferably connected to the cathode exhaust path in a fluid-conducting manner. In this way, the cathode operating medium sucked from the cathode chambers is delivered to the conventional cathode exhaust path, and thus to an exhaust system present there. This embodiment additionally allows doing without an additional outlet with its own sound absorber and possibly a flame filter on its own output.

In a preferred embodiment of the invention, the cathode supply comprises a turbine arranged in the cathode exhaust path. Such a turbine in particular serves for the driving of the compressor arranged in the cathode supply path, wherein the turbine and the compressor are connected to one another via a common shaft. In such a system equipped with a turbine, the ejector is preferably connected in a fluid-conducting manner on the output side to the cathode exhaust path on the low-pressure side of the turbine. The suction capacity of the ejector is thereby increased and the evacuation of the cathode chambers when the system is switched off is accelerated.

The cathode supply can furthermore comprise what is known as a wastegate line, which connects the cathode supply path to the cathode exhaust path. This allows for compressed cathode operating gas to be guided directly into the cathode exhaust gas line while bypassing the fuel cell stack. In this way, the operating pressure of the fuel cell stack can be varied quickly depending on a current load requirement, without the performance of the compressor having to be affected, which is a comparatively sluggish process.

In one embodiment of the invention, the ejector is arranged in the wastegate line. In this way, only one additional line is required for its circuit, namely a negative-pressure line, which connects the suction side of the ejector to the cathode chambers, in particular to the cathode exhaust path.

In an alternative embodiment of the invention, the ejector is arranged (directly) in the cathode exhaust path. This means that its pressure input and its output are directly connected to the cathode exhaust path. This embodiment is also associated with little plumbing effort. However, cathode exhaust gas also flows through the ejector during normal operation. So that compressed cathode operating gas is also applied to the pressure input of the ejector in this embodiment, the cathode supply in this case preferably comprises a wastegate line that connects the anode supply path to the anode exhaust path upstream of the ejector.

In the preferred embodiment of the invention, the fuel cell system furthermore comprises a flushing line which branches off from the anode supply path or the anode exhaust path of the anode supply and leads to the cathode supply path or the cathode exhaust path of the cathode supply. By means of such a flushing line, a fluid connection between the cathode supply and the anode supply can be established when switching off the fuel cell system so that fuel can be supplied to the cathode chambers from the anode supply. Preferably, the flushing line connects the anode exhaust path to the cathode exhaust path.

In another embodiment of the invention, the fuel cell system furthermore comprises an adjusting means for regulating a gas mass flow, which adjusting means is arranged upstream of the suction side of the ejector, i.e. between the cathode chambers of the fuel cell stack and the suction input of the ejector. The adjusting means can function actively or passively and is designed as a valve (for example, a passive check valve or an actively adjustable valve) or flap, for example. Such an adjusting means prevents cathode exhaust gas from flowing through the ejector or back into the cathode chambers during normal operation of the fuel cell system, i.e. when it is not to be shut down.

The invention furthermore relates to a method for switching off a fuel cell, in particular in a fuel cell system according to the present invention. The method comprises the steps of:

Separating the cathode chambers of the fuel cell stack from the environment,

Generating a negative pressure in the cathode chambers in order to remove a cathode operating gas from the cathode chambers by means of an ejector, and Introducing a fuel into the cathode chambers in order to react the fuel with the residual oxygen present in the cathode chambers.

By generating a negative pressure in the cathode chambers, any operating gas, in particular oxygen, present there is quickly removed from the cathode chambers. During the subsequent introduction of the fuel, such as hydrogen, into the cathode chambers, the fuel reacts with any residual oxygen still present to form water. Since only very little residual oxygen is present as a result of the previous evacuation of the cathode chambers, a correspondingly small quantity of fuel is required to completely react the oxygen.

Optionally, a supply of a cathode operating gas into the cathode chambers of the fuel cell stack is interrupted prior to separating the cathode chambers from the environment. The operating power required for driving a compressor for the cathode operating gas is thereby reduced.

Preferably, prior to separating the cathode chambers from the environment and possibly after interrupting the supply of the cathode operating gas, a reduction of an overpressure prevailing in the cathode chambers takes place by discharging the cathode operating gas from the cathode chambers. In this way, a large portion of the cathode operating gas present in the cathode chambers is already removed from them. The discharging of the cathode operating gas preferably takes place until ambient pressure has substantially been reached in the cathode chambers.

In a preferred embodiment of the method according to the invention, the ejector is operated by a compressed cathode operating gas as propellant. Since such a compressed cathode operating gas is basically provided during the operation of the fuel cell system anyway, this operating gas can be used for operating the ejector without additional expenditure. In particular, a compressor arranged in the cathode supply path is in this case used to compress the operating gas.

Additional preferred embodiments of the invention arise from the other features stated in the sub-claims.

The various embodiments of the invention mentioned in this application may be combined advantageously with one another unless stated otherwise in individual cases.

The invention is explained below in exemplary embodiments on the basis of the respective drawings. They show.

Figure 1:
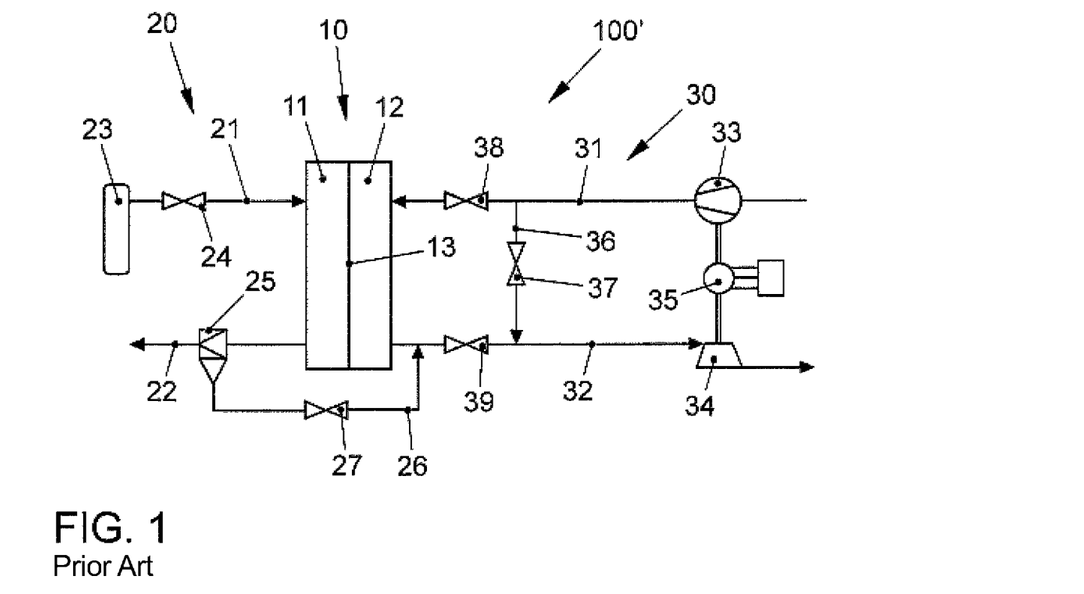
FIG. 1 a fuel cell system according to the prior art.

FIG. 1 shows a fuel cell system, denoted overall by 100', according to the prior art. The fuel cell system 100' comprises a fuel cell stack 10 as a core component. The fuel cell stack 10 comprises an anode chamber 11 and a cathode chamber 12, which are separated from one another by an ion-conductive polymer electrolyte membrane 13. The anode and cathode chamber 11, 12 respectively comprise a catalytic electrode, the anode and cathode respectively, which catalyzes the respective partial reaction of the fuel cell conversion. In a fuel cell stack, a plurality of such individual cells are typically arranged in the form of a stack, wherein a bipolar plate is respectively arranged between two membrane electrode assemblies, which bipolar plate serves to supply operating media into the anode and cathode chambers 11, 12, and furthermore establishes the electrical connection between the individual fuel cells.

In order to supply the fuel cell stack 10 with the operating gases, the fuel cell system 100' comprises on the one hand an anode supply 20 and on the other hand a cathode supply 30.

The anode supply 20 comprises an anode supply path 21 which serves to supply an anode operating gas, such as hydrogen, to the anode chambers 11. For this purpose, the anode supply path 21 connects a fuel reservoir 23 to the fuel cell stack 10. An adjusting means 24 arranged in the anode supply path 21 serves to regulate a mass flow of the fuel. The adjusting means 24 is, for example, designed as a control valve.

The anode supply 20 also comprises an anode exhaust path 22 which discharges the anode exhaust gas from the anode chambers 11 of the fuel cell stack 10. A water separator 25 may optionally be installed in the anode exhaust path 22, which water separator removes the product water of the fuel cell reaction. In addition, the anode supply 20 may comprise a fuel recirculation line (not shown), which connects the anode exhaust path 22 to the anode supply path 21. The recirculation of fuel is customary in order to return the mostly over-stoichiometrically used fuel and use it.

The cathode supply 30 comprises a cathode supply path 31 which supplies a cathode operating gas to the cathode chambers 12. The cathode operating gas is, for example, air. A compressor 33 is arranged in the cathode supply path 31 in order to convey and compress the air.

A cathode exhaust path 32 conveys the cathode exhaust gas (exhaust air) away from the cathode chambers 12 and possibly supplies it to an exhaust system that is not shown. As shown here, the compressor 33 may optionally be driven by a turbine 34 which is arranged in the cathode exhaust path 32. In this case, the compressor 33 and the turbine 34 are connected to one another via a common shaft. An electric motor 35 supports the supply of a drive to the compressor 33.

A wastegate line 36 branching off from the cathode supply path 31 connects the cathode supply path 31 to the cathode exhaust path 32. The wastegate line 36 serves to bypass the fuel cell stack 10 if the compressed cathode operating gas is not required in the fuel cell stack 10, for example in low-load phases, but the compressor 33 on the other is not to be shut down. An adjusting means 37 which is designed as a flap or control valve, for example, may optionally be arranged in the wastegate line 36. The adjusting means 37 regulates a mass flow flowing through the wastegate line 36 and thus controls a performance of the fuel cell stack 10.

Another adjusting means 38 is arranged in the cathode supply path 31 downstream of the branching point of the wastegate line 36. Yet another adjusting means 39 is present in the cathode exhaust path 32 upstream of a merging point of the wastegate line 36. The adjusting means 38, 39 are also designed as flaps or valves and allow for the separation of the cathode chambers 12 of the fuel cell stack 10 from the environment.

The fuel cell system 100' furthermore comprises a flushing line 26 which branches off from the anode exhaust path 22 and leads to the cathode exhaust path 32. An adjusting means (flap or valve) 27 arranged in the flushing line 26 serves to regulate the flow rate. The discharging of the water condensed in the water separator 25 preferably takes place via the flushing line 26 in the cathode exhaust path 32. Alternatively, the flushing line 26 may branch off directly from the cathode exhaust path 32 instead of from the water separator 25.

Various further details of the cathode supply 30 are not shown in the simplified FIG. 1 for reasons of clarity. For example, the cathode supply 30 may comprise a heat exchanger which serves to preheat the air compressed by the compressor 33. As a heat carrier, the warm exhaust air coming from the cathode chambers 12 typically flows through the heat exchanger. In the process, the heat exchanger may be bypassed by means of an appropriate bypass line on the part of both the cathode supply path 31 and the cathode exhaust path 32. A turbine bypass line may furthermore be provided on the part of the cathode exhaust path 32, which bypass line bypasses the turbine 34. Systems without turbine 34 are also known. A water separator may furthermore be installed in the cathode exhaust path 32 in order to condense and drain product water arising from the fuel cell reaction.

In order to eliminate oxygen from the cathode chambers 12 when the fuel cell system 100' is switched off, the fuel cell system 100' shown in FIG. 1 is operated as follows. After the fuel cell stack 10 has been disconnected from the electrical power drain of an electrical consumer or of an energy storage device, the cathode chambers 12 of the stack 10 are separated from the environment by closing the two adjusting means 38 and 39 at the respective inlet and outlet of the fuel cell stack 10. Subsequently, the valve 27 in the flushing line 26 is opened and the cathode chambers 12 are thus connected to the anode supply 20. The fuel is thus supplied to the cathode chambers 12 and reacts with the oxygen of the air present there to form water. In this way, the molecular oxygen is removed from the cathode chambers 12. For this process, the fuel (hydrogen) and the oxygen must be brought into contact with one another at the cathode electrodes. This is a diffusion-controlled and thus relatively slow process. In addition, an unequal distribution of the gases may occur. Moreover, a comparatively large quantity of fuel is required in order to completely react the quantity of oxygen present in the cathode chambers 12.

The fuel cell systems according to the invention that are illustrated in exemplary embodiments in the following Figures remedy this problem. In this respect, corresponding elements are denoted by the same reference symbol as in FIG. 1 and are not explained again. Rather, only the differences compared to FIG. 1 and relevant to the invention are addressed below.

Figure 2:
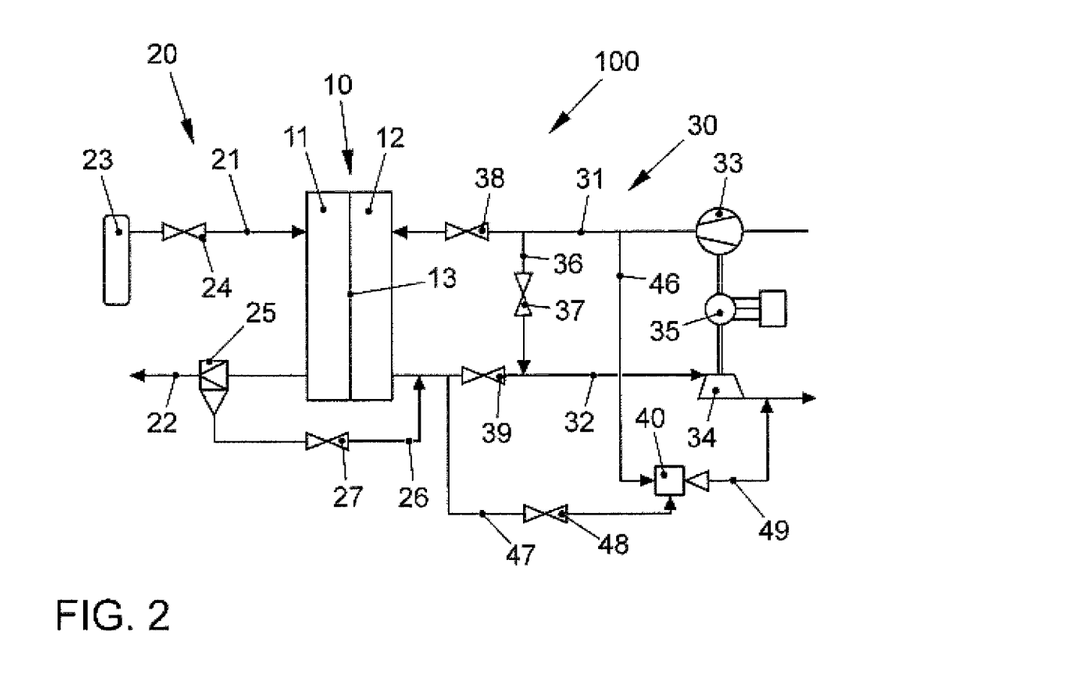
FIG. 2 a fuel cell system according to a first embodiment of the invention.
Figure 3:
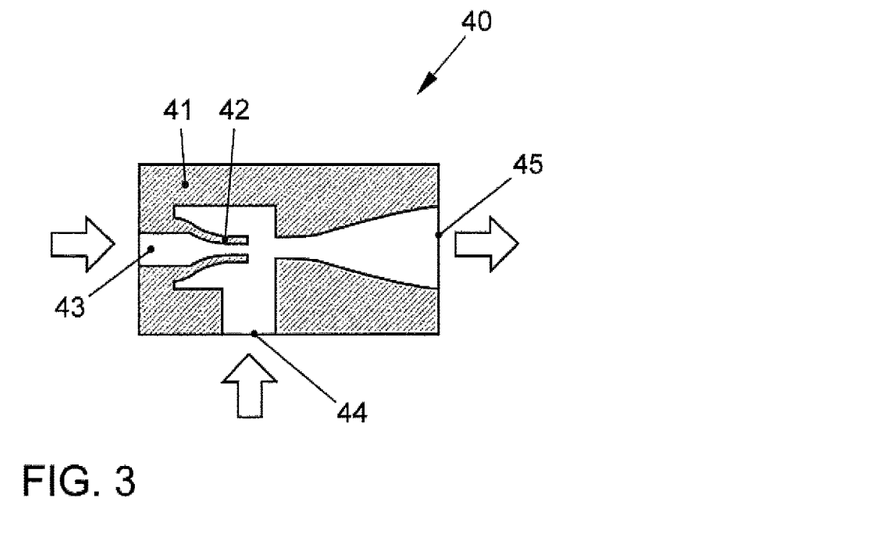
FIG. 3 structure of an ejector.

According to the invention, in accordance with FIG. 2, the cathode supply 30 is equipped with an ejector 40, the basic structure and functionality of which is explained using FIG. 3.

The ejector 40 shown in FIG. 3 comprises a base body 41 with a drive nozzle 42 formed therein. The ejector 40 furthermore comprises three connectors, namely a pressure input 43 to which a propellant is applied, a suction input or negative-pressure connector 44 which is connected to a chamber to be evacuated, and an output 45. In deviation from the ejector shown in FIG. 3, the ejector 40 may be designed to be controllable.

According to the invention, the ejector 40 is connected on the pressure input side, i.e. using its pressure input 43, to the cathode supply path 31, namely downstream of the compressor 33. In the exemplary embodiment according to FIG. 2, this takes place via a pressure input line 46 which branches off from the cathode supply path 31 on the high-pressure side of the compressor 33 and upstream of the adjusting means 38, in particular upstream of the wastegate line 36. An adjusting means (flap or valve) may optionally be installed in the pressure input line 46 for regulating the gas mass flow; or the ejector 40 is designed to be controllable. The ejector 40 is furthermore connected on the suction side, i.e. using its negative-pressure connector 44, to the cathode chambers 12 of the fuel cell stack 10. According to FIG. 2, this takes place via a negative-pressure line 47 which branches off from the cathode exhaust path 32 upstream of the adjusting means 39 and upstream of the wastegate line 36. In the negative-pressure line 47, another adjusting means 48 is arranged which serves to seal off the ejector 40 from the cathode chambers 12 during normal operation of the fuel cell system 100. The gases brought together in the ejector 40 leave the ejector via the output 45 via an output line 49 which leads to the cathode exhaust path 32 downstream of the turbine 34, i.e. on its low-pressure side, in the example shown in FIG. 2. The ejector may optionally also be equipped with a sound absorber connected to the output 45.

Figure 4:
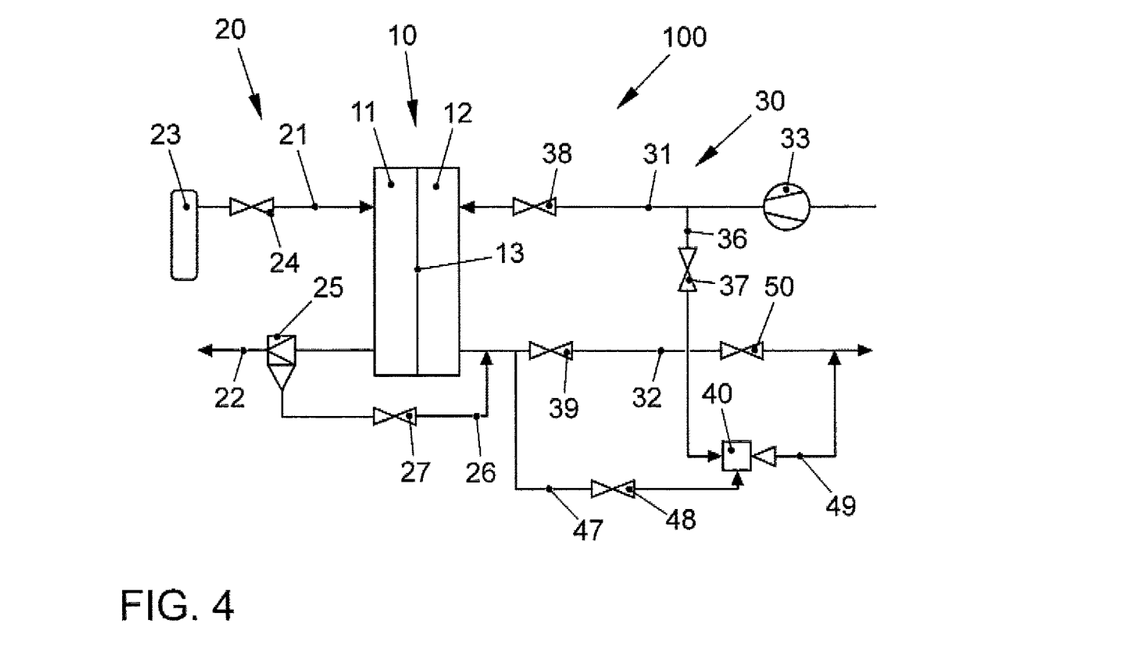
FIG. 4 a fuel cell system according to a second embodiment of the invention.

In a modification of the embodiment shown in FIG. 2, the wastegate line 36 instead of the pressure input line 46 is connected to the pressure input 43 of the ejector 40 (similarly to FIG. 4). A separate pressure input line 46 may then be dispensed with.

The system shown in FIGS. 2 and 3 shows the following function:

During normal operation of the fuel cell stack 10, i.e. as long as an electrical power is tapped from it, the adjusting means 24, 38, 39 are open and the adjusting means 27 and 48 are closed. The wastegate adjusting means 37 is closed or partially or fully open depending on a load point of the system. If the fuel cell stack 10 is to be switched off, the stack is first disconnected from the electrical load removal. Subsequently, the adjusting means 38 and 39 are closed in order to separate the cathode chambers 12 of the fuel cell stack 10 from the environment. The compressor 33 can at this time continue to be operated and thus charges the pressure input 43 of the ejector 40. Then, the adjusting means 48 in the negative-pressure line 47 is opened and the cathode chambers 12 are thus connected to the ejector 40. The pressurized air enters the ejector 40 via the pressure connector 43 and flows through the nozzle 42. According to the Venturi principle, a negative pressure develops directly downstream of the drive nozzle 42, whereby air is aspirated and sucked from the cathode chambers 12 via the negative-pressure line 47. The suctioned air and the compressed air exit together via the output 45 via the output line 49. After a specified period of time or upon reaching a predefined negative pressure in the cathode chambers 12, the adjusting means 48 in the negative-pressure line 47 is closed and the adjusting means 27 in the flushing line 26 is opened. Fuel (hydrogen) thereby flows into the cathode chambers 12 and reacts with any residual oxygen still present there in order to convert it to water. Subsequently, the adjusting means 27 in the flushing line 26 is closed. In this state, the cathode chambers 12 of the fuel cell stack 10 are thus completely separated from the environment. The system may be left in this state until it is restarted.

Optionally, only the adjusting means 38 may be closed initially when switching off the fuel cell stack 10, and the adjusting means 39 may initially still remain open in order to discharge the air present in the cathode chambers 12. This preferably takes place until the pressure level in the cathode chambers 12 corresponds to the ambient pressure. Only then is the adjusting means 39 closed and the cathode chambers 12 are connected to the ejector 40 by opening the adjusting means 48.

Figure 5:
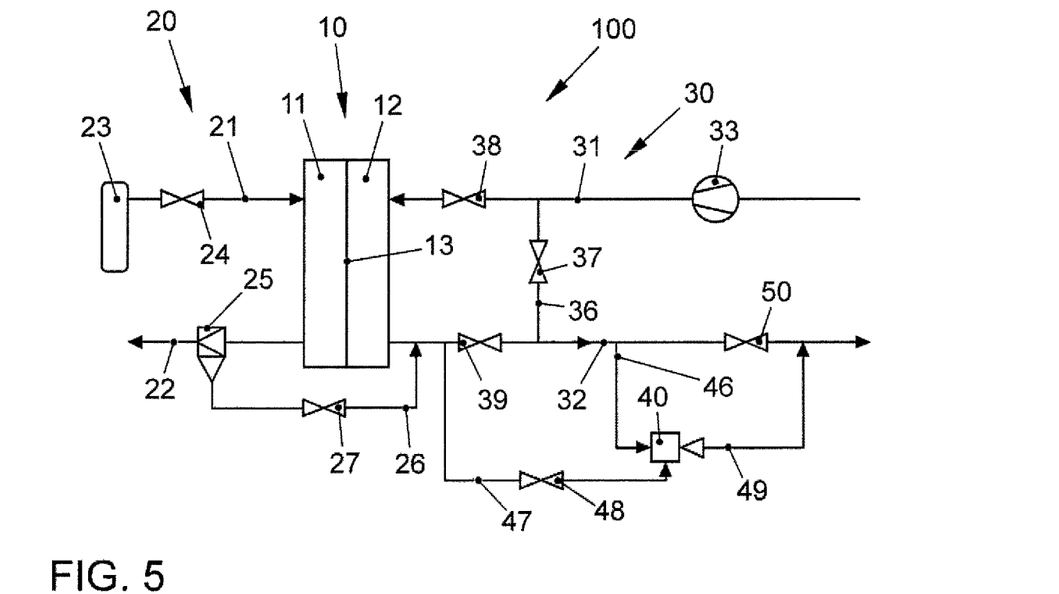
FIG. 5 a fuel cell system according to a third embodiment of the invention.
Figure 6:
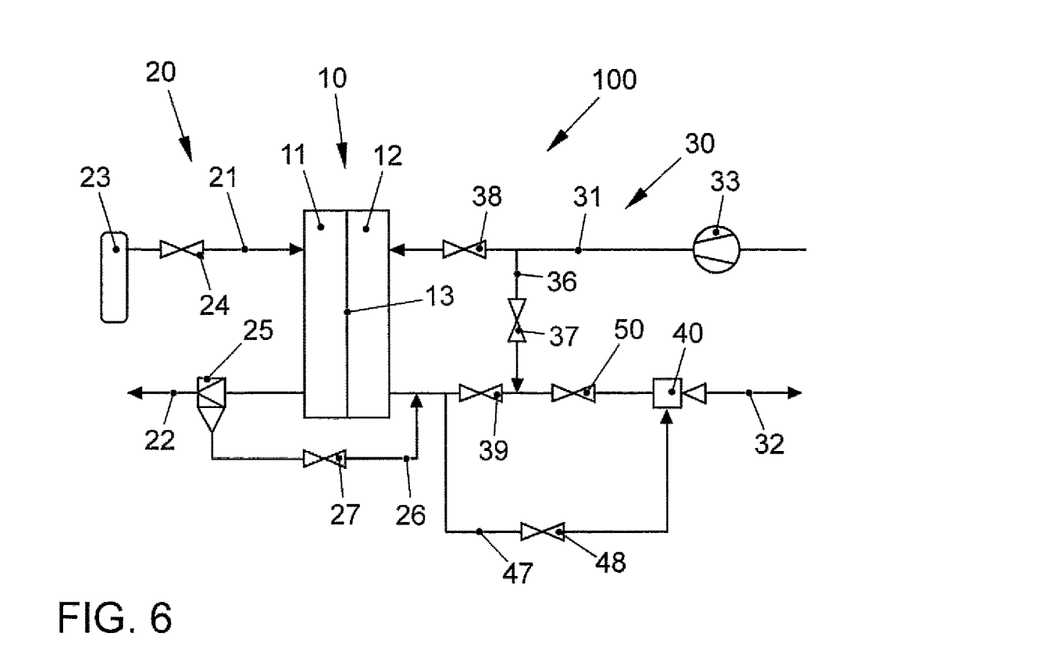
FIG. 6 a fuel cell system according to a fourth embodiment of the invention.

Whereas FIG. 2 shows a fuel cell system according to the invention in which fuel cell system a turbine 34 is present in the cathode exhaust gas line 32, the following FIGS. 4 to 6 show alternative fuel cell systems according to the invention that do not comprise such a turbine.

According to FIG. 4, the ejector 40 is connected on the pressure input side to the wastegate line 36, and can thus be charged via this line with compressed cathode air. Instead of the turbine 34 from FIG. 2, the system according to FIG. 4 comprises an additional adjusting means 50 arranged in the cathode exhaust path 32, with the adjusting means preferably being designed as an adjustable valve or as an adjustable flap. In addition to a completely closed and a completely open position, the adjusting means 50 can thus be adjusted in any arbitrary intermediate positions. The output line 49 leads to the cathode exhaust path 32 downstream of the adjusting means 50. In the embodiment shown in FIG. 4, the ejector 40 is actually arranged in the wastegate line formed in this case by the line segments 36 and 49.

In the circuit shown in FIG. 4, the adjusting means 37 may be dispensed with. In a modification similar to FIG. 2, via an additional pressure input line 46 which branches off from the cathode supply path 31 the ejector 40 may furthermore be connected on the pressure input side to said cathode supply path, and the wastegate line 36 may directly lead to the cathode exhaust path 32.

In the system shown in FIG. 5, the wastegate line 36 leads to the cathode exhaust path 32, and the pressure input line 46 which charges the ejector 40 with compressed cathode operating medium branches off from the cathode exhaust gas line 32 downstream of the wastegate line 36. Optionally, an adjusting means (valve or flap) not shown here may be connected in the pressure input line 46 upstream of the drive nozzle of the ejector 40. In this embodiment, the ejector 40 is connected in a bypass line virtually in parallel to the cathode exhaust path 32.

Another variant of a fuel cell system 100 according to the invention is shown in FIG. 6. In this example, the ejector 40 is directly arranged in the cathode exhaust path 32. This means that its pressure input 43 and its output 45 are directly connected to the cathode exhaust path 32.

Figure 7:
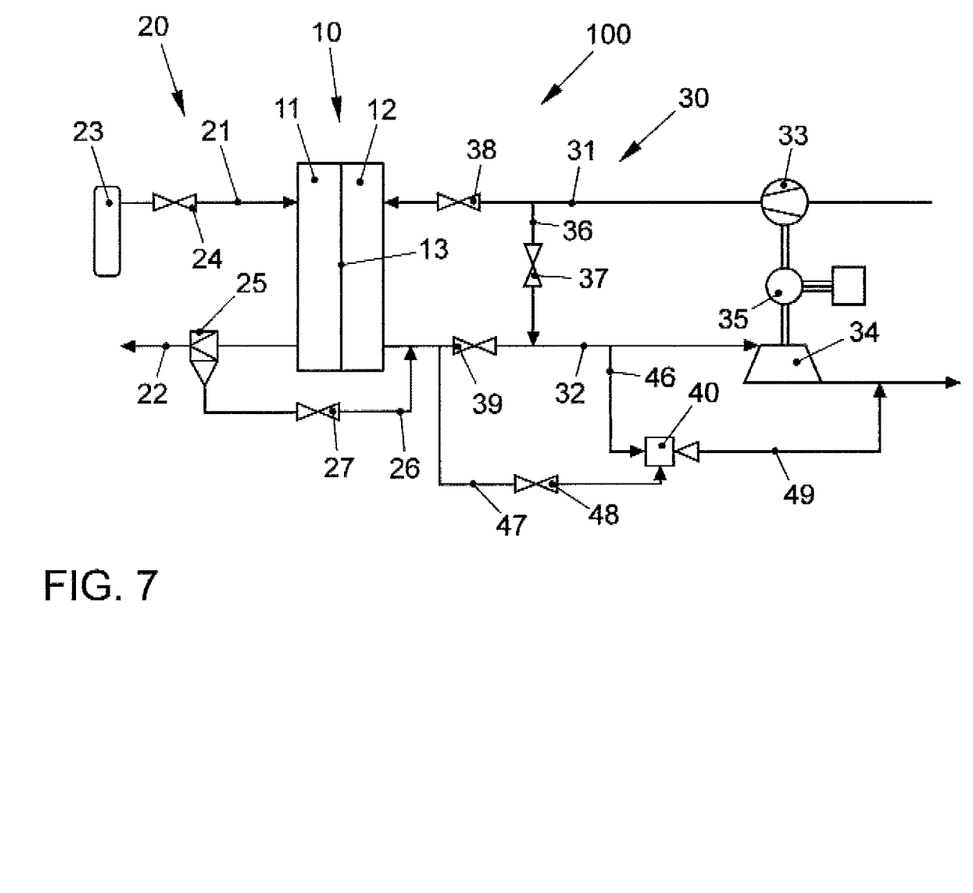
FIG. 7 a fuel cell system according to a fifth embodiment of the invention.

FIG. 7 shows another embodiment of a fuel cell system 100 according to the invention, comprising a turbine 34. In contrast to FIG. 2 and similar to FIG. 5, the pressure input line 46 branches off from the cathode exhaust path 32 downstream of the merging point of the bypass line 36. The ejector is thus connected in a bypass circumventing the turbine 34. In this case, an adjusting means may optionally also be arranged in the pressure input line 46 upstream of the drive nozzle of the ejector 40.

The advantage of the embodiments shown in FIGS. 2, 4, 5, and 7 is that the ejector 40 is respectively connected in parallel to the cathode exhaust path 32 so that the cathode exhaust gas stream does not need to flow through the ejector 40 during normal operation. The ejector 40 can thus be dimensioned smaller in these embodiments than in the embodiment according to FIG. 6, which is linked with lower leakage currents. The embodiment according to FIG. 2, in which the ejector 40 is positioned in a line connection (46, 49) between the cathode supply path 31 and the cathode exhaust path 32 in addition to the wastegate line 36, allows for the smallest design of the ejector and thus the lowest leakage currents.

LIST OF REFERENCE SYMBOLS

100 Fuel cell system
100' Fuel cell system according to the prior art
10 Fuel cell stack
11 Anode chamber
12 Cathode chamber
13 Polymer electrolyte membrane
20 Anode supply
21 Anode supply path
22 Anode exhaust path
23 Fuel tank
24 Adjusting means/valve
25 Water separator
26 Flushing line
27 Adjusting means/valve
30 Cathode supply
31 Cathode supply path
32 Cathode exhaust path
33 Compressor
34 Turbine
35 Electric motor
36 Wastegate line
37 Wastegate line
38 Adjusting means/valve
39 Adjusting means/valve
40 Negative-pressure generation means/ejector
41 Base body
42 Drive nozzle
43 Pressure input
44 Suction input/negative-pressure connector
45 Output
46 Pressure input line
47 Negative-pressure line
48 Adjusting means
49 Output line
50 Adjusting means

The invention claimed is:

1. A fuel cell system, comprising:
a fuel cell stack including anode chambers and cathode chambers;
an anode supply including an anode supply path for supplying an anode operating gas to the anode chambers and an anode exhaust path for discharging an anode exhaust gas from the anode chambers; and
a cathode supply including a cathode supply path for supplying a cathode operating gas to the cathode chambers and a cathode exhaust path for discharging a cathode exhaust gas from the cathode chambers, and including an ejector for generating a negative pressure in the cathode chambers;
wherein the ejector is connected in a fluid-conducting manner on a pressure input side directly to a compressor arranged in the cathode supply path, on an output side directly to the cathode exhaust path, and on a suction side directly to the cathode chambers of the fuel cell stack.

2. The fuel cell system according to claim 1 wherein the cathode supply includes a turbine arranged in the cathode exhaust path and the ejector is connected in a fluid-conducting manner on the output side to the cathode exhaust path on the low-pressure side of the turbine.

3. The fuel cell system according to claim 1 wherein the fuel cell system furthermore includes a flushing line, which branches off from the anode supply path or the anode exhaust path and leads to the cathode supply path or the cathode exhaust path.

4. The fuel cell system according to claim 1 wherein the fuel cell system furthermore includes a valve for regulating a gas mass flow, the valve is arranged upstream of the suction side of the ejector.

5. The fuel cell system according to claim 1 wherein the cathode supply includes a wastegate line that connects the cathode supply path to the cathode exhaust path, and the ejector is arranged in the wastegate line.

6. The fuel cell system according to claim 1 wherein the ejector is arranged in the cathode exhaust path.

7. A method, comprising:
switching off a fuel cell stack of a fuel cell system, the switching including:
separating cathode chambers of the fuel cell stack from an environment;
generating a negative pressure in the cathode chambers in order to remove a cathode operating gas from the cathode chambers by an ejector; and
introducing a fuel into the cathode chambers in order to react the fuel with residual oxygen present in the cathode chambers.

8. The method according to claim 7 wherein the ejector is operated by a compressed cathode operating gas as propellant.

9. The method according to claim 7 wherein an overpressure prevailing in the cathode chambers is reduced by discharging the cathode operating gas, in particular to ambient pressure, prior to separating the cathode chambers from the environment.

10. A fuel cell system, comprising:
- a cathode chamber;
- a cathode supply path coupled to the cathode chamber to supply a cathode operating gas to the cathode chamber;
- a compressor coupled to the cathode supply path to compress the cathode operating gas within the cathode supply path; and
- an ejector having a pressure input connector directly coupled to the cathode supply path and a suction input connector directly coupled to the cathode chamber such that compressed cathode operating gas travelling through the ejector can draw a vacuum in the cathode chamber.

11. The fuel cell system of claim 10, further comprising:
an anode chamber; and
a fuel flushing path coupled to the anode chamber and to the cathode chamber.

\* \* \* \* \*